(12) United States Patent
Brennand

(10) Patent No.: US 8,555,501 B2
(45) Date of Patent: Oct. 15, 2013

(54) METHOD OF MANUFACTURING A BLADE

(75) Inventor: Phillip Brennand, Barnoldswick (GB)

(73) Assignee: Rolls-Royce plc, London (GB)

( * ) Notice: Subject to any disclaimer, the term of this patent is extended or adjusted under 35 U.S.C. 154(b) by 1059 days.

(21) Appl. No.: 12/699,547

(22) Filed: Feb. 3, 2010

(65) Prior Publication Data

US 2010/0281690 A1   Nov. 11, 2010

(30) Foreign Application Priority Data

Feb. 27, 2009 (GB) .................................. 0903281.4

(51) Int. Cl.
*B21D 53/78* (2006.01)

(52) U.S. Cl.
USPC ..................................... 29/889.72; 29/889.7

(58) Field of Classification Search
USPC ......... 29/889.7, 889.72, 421.1; 228/157, 190; 244/123.14
See application file for complete search history.

(56) References Cited

U.S. PATENT DOCUMENTS

| | | | |
|---|---|---|---|
| 3,927,817 A * | 12/1975 | Hamilton et al. | ............. 228/157 |
| 4,882,823 A * | 11/1989 | Weisert et al. | ................... 29/6.1 |
| 5,240,376 A | 8/1993 | Velicki | |
| 5,253,419 A | 10/1993 | Collot et al. | |
| 5,384,959 A | 1/1995 | Velicki | |
| 5,479,705 A | 1/1996 | Fowler et al. | |
| 5,692,881 A * | 12/1997 | Leibfried | ...................... 416/233 |
| 5,826,332 A | 10/1998 | Bichon et al. | |
| 6,279,228 B1 | 8/2001 | Kobayashi et al. | |
| 8,382,441 B2 * | 2/2013 | Brennand et al. | ......... 416/229 R |

FOREIGN PATENT DOCUMENTS

| | | |
|---|---|---|
| EP | 0 765 711 A1 | 4/1997 |
| GB | 2 289 429 A | 11/1995 |

OTHER PUBLICATIONS

European Search Report dated Jun. 11, 2010 in European Patent Application No. EP 10 25 0185.
British Search Report issued on Mar. 25, 2009 in British Application No. GB0903281.4.

* cited by examiner

*Primary Examiner* — Essama Omgba
*Assistant Examiner* — Ryan J Walters
(74) *Attorney, Agent, or Firm* — Oliff and Berridge, PLC

(57) ABSTRACT

A method of manufacturing a blade comprising: applying a stop-off material in a first predetermined pattern between a first layer and a membrane so as to prevent a diffusion bond from forming between the first layer and the membrane across said first predetermined pattern; and applying the stop-off material in a second predetermined pattern between a second layer and the membrane; wherein the first and second predetermined patterns are arranged to allow a diffusion bond to be formed along the blade tip edge, the diffusion bond along the blade tip edge extending across the blade in a chord-wise direction; applying the first and second predetermined patterns so that over at least a first portion of the blade chord at the blade tip, a greater portion of the first layer at the tip edge, extending in a span-wise direction, is diffusion bonded to the membrane than the opposing second layer.

7 Claims, 4 Drawing Sheets

(i)    (ii)

Prior Art

METHOD OF MANUFACTURING A BLADE

The present invention relates to a method of manufacturing a blade for a turbomachine by superplastic forming and diffusion bonding.

It is known to manufacture hollow metallic turbomachine blades, in particular fan blades for a jet engine, by superplastic forming and diffusion bonding metal workpieces, the workpieces forming pressure and suction surfaces of the blade. These metal workpieces may include elemental metal, metal alloys and metal matrix composites. At least one of the metal workpieces may be capable of superplastic extensions. In one known process the surfaces of the workpieces to be joined are cleaned, and at least one surface of one or more of the workpieces is coated in preselected areas with a stop-off material to prevent diffusion bonding. The workpieces are arranged in a stack and the edges of the workpieces are welded together, except where a pipe is welded to the workpieces, to form an assembly. The pipe enables a vacuum, or inert gas pressure, to be applied to the interior of the assembly. The assembly is placed in an autoclave and heated so as to "bake out" the binder from the material to prevent diffusion bonding. The assembly may then be evacuated, using the pipe, and the pipe is sealed. The sealed assembly is placed in a pressure vessel and is heated and pressed to diffusion bond the workpieces together to form an integral structure. Diffusion bonding occurs when two matt surfaces are pressed together under temperature, time and pressure conditions that allow atom interchange across the interface. The first pipe is removed and a second pipe is fitted to the diffusion bonded assembly at the position where the first pipe was located. The integral structure is located between appropriately shaped dies and is placed within an autoclave. The integral structure and dies are heated and pressurised fluid is supplied through the second pipe into the interior of the integral structure to cause at least one of the workpieces to be superplastically formed to produce an article matching the shape of the dies.

In addition to the hollow structure just described, it is also known to insert a membrane 2 between the metal workpieces 4, 6 prior to the above described process (see FIG. 1 for example). The location of diffusion bonds between the membrane and the adjacent workpieces can be controlled by applying the stop-off material to preselected areas on each side of the membrane (or respective workpieces). When the blade is subsequently expanded, the membrane adheres to the workpieces where the diffusion bond is allowed to form and thereby provides an internal structure (see for example the Warren girder type construction shown in FIG. 2).

Various internal structures have been proposed and different preselected patterns of the stop-off material are required to achieve these structures. For example, an egg box type internal structure can be provided by applying the stop-off material to both sides except for a series of non-overlapping dots on either side. Blades produced with such an internal structure are very rigid, but a downside of this rigidity is that they are prone to failure following a bird strike.

To resolve this problem, U.S. Pat. No. 5,479,705 discloses an internal structure with a Warren girder type cross-section, which is formed by a pattern of alternating strips 10, 12 on either side of the membrane where there is no stop-off material (see FIGS. 1 and 2 for example). Such blades are better at withstanding a bird strike due to the presence of a crumple zone which allows them to yield rather than fracture. However, during the expansion of the blade the membrane may stick to the pressure surface workpiece in the region between the blade tip and the edge of the aforementioned strips, because the stop-off material sticks to the pressure surface and sufficient gas may not be able to flow either side of the membrane in this region. This sticking may inhibit the expansion during the superplastic process and this can be particularly problematic for the pressure surface which should move the most during the expansion process (see for example the pressure surface 18 shown in FIG. 3b(ii)). Furthermore, the shape of the pressure surface of a fan blade is aerodynamically very important.

To prevent the membrane from sticking to the pressure surface, a pattern comprising the previously mentioned strips 10, 12, but with additional dots 14 on the suction side 16 has been proposed (see FIG. 3a). The strips 10 are on the suction side 16 and the strips 12 are on the pressure side 18. With such a bond pattern, the dots 14 are in the tip area of the blade and are in line with the strips 10 printed on the suction side 16 of the membrane.

The dots 14 define further regions in which there is no stop-off material and in which a diffusion bond is allowed to form on the suction panel. The dots therefore ensure that the membrane adheres to the suction surface at the tip region and keeps the membrane away from the pressure surface so as not to inhibit the expansion of the pressure surface (see FIGS. 3a and 3b).

However, a problem with the strip and dot pattern is that insufficient gas can flow around either side of the membrane, in particular between the suction surface and the membrane. In other words, the dots, being printed on the suction panel, cause the membrane to be held against that panel, hence trapping the gas over the tip region. When this occurs, uneven gas pressure causes distortion of the membrane producing unacceptable components. Furthermore, it is desirable to find a solution which will not require recertification of the blade as this is costly and time consuming.

According to a first aspect of the present invention there is provided a method of manufacturing a blade for a turbomachine by superplastic forming and diffusion bonding a first layer, a second layer and a membrane, the membrane being disposed between the first and second layers, the method comprising: applying a stop-off material in a first predetermined pattern between the first layer and the membrane so as to prevent a diffusion bond from forming between the first layer and the membrane across said first predetermined pattern; and applying the stop-off material in a second predetermined pattern between the second layer and the membrane so as to prevent a diffusion bond from forming between the second layer and the membrane across said second predetermined pattern; wherein the first and second predetermined patterns are arranged so as to allow a diffusion bond to be formed along the blade tip edge, the diffusion bond along the blade tip edge extending across the blade in a chord-wise direction; applying the first and second predetermined patterns so that over at least a first portion of the blade chord at the blade tip, a greater portion of the first layer at the tip edge, extending in a span-wise direction, is diffusion bonded to the membrane than the opposing second layer.

The first predetermined pattern may define one or more first discrete zones of stop-off material, the stop-off material preventing a diffusion bond from forming between the first layer and the membrane in the said first discrete zones. Similarly, the second predetermined pattern may define one or more second discrete zones of stop-off material, the stop-off material preventing a diffusion bond from forming between the second layer and the membrane in the said second discrete zones.

The first pattern may be applied such that it defines one or more strips arranged in a span-wise direction and the strips may be void of the stop-off material. The second pattern may be applied such that it defines one or more strips arranged in a span-wise direction and the strips may be void of the stop-off material.

The second pattern may be applied such that it defines one or more dots, the dots being void of the stop-off material. The second pattern may be applied such that one of the one or more dots are located between one of the one or more strips and the blade tip edge.

The first layer may form a pressure surface or a suction surface of a turbomachine blade and the second layer may form the other of the pressure surface or suction surface. The blade may be a compressor fan blade.

The method may further comprise applying the first and second predetermined patterns so that over at least a second portion of the blade chord at the blade tip, a greater portion of the second layer at the tip edge extending in a span-wise direction is diffusion bonded to the membrane than the opposing first layer.

The method may further comprise heating and pressing the first and second layers and the membrane to diffusion bond the first and second layers and the membrane together to form an integral structure. The method may further comprise placing the first and second layers and the membrane between appropriately shaped dies; heating the first and second layers, the membrane and dies; and supplying a pressurised fluid between the first and second layers to cause at least one of the first and second layers to be superplastically formed.

According to a second aspect of the present invention there is provided a blade for a turbomachine comprising a first layer, a second layer and a membrane therebetween, wherein over at least a portion of the blade chord at the blade tip, a greater portion of the first layer at the tip edge extending in a span-wise direction is bonded to the membrane than the opposing second layer.

For a better understanding of the present invention, and to show more clearly how it may be carried into effect, reference will now be made, by way of example, to the accompanying drawings, in which:—

FIG. 4b shows a sectional view of the fan blade tip after superplastic expansion for (i) the blade tip shown in FIG. 3a; and (ii) the blade tip shown in FIG. 4a.

Figure 1:
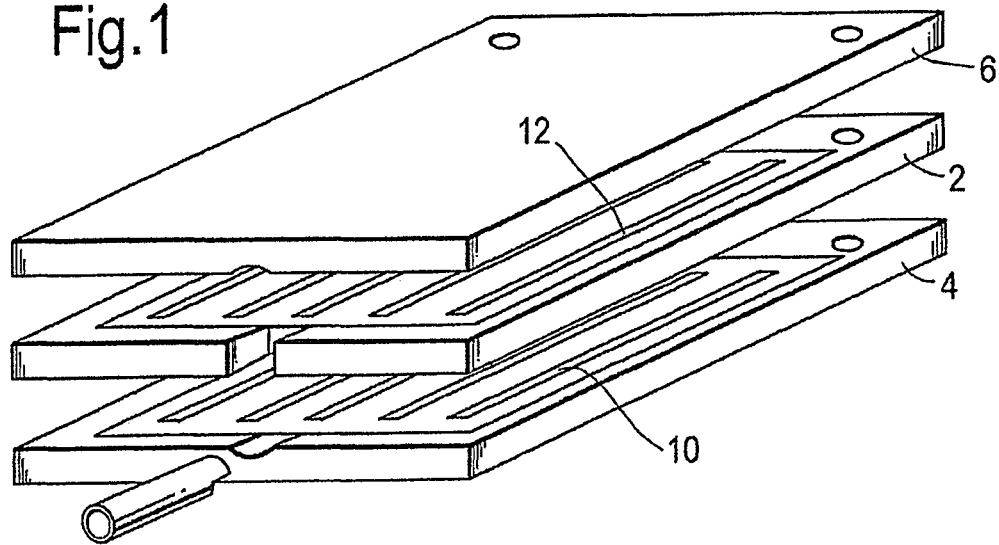
FIG. 1 illustrates an exploded view of a prior art arrangement of workpieces which are superplastically formed and diffusion bonded to form a fan blade.
Figure 2:
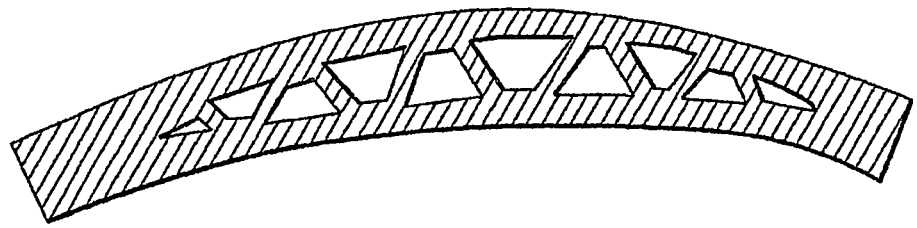
FIG. 2 shows a cross-section through the internal structure of a fan blade after diffusion bonding and superplastic expansion.
Figure 3A:
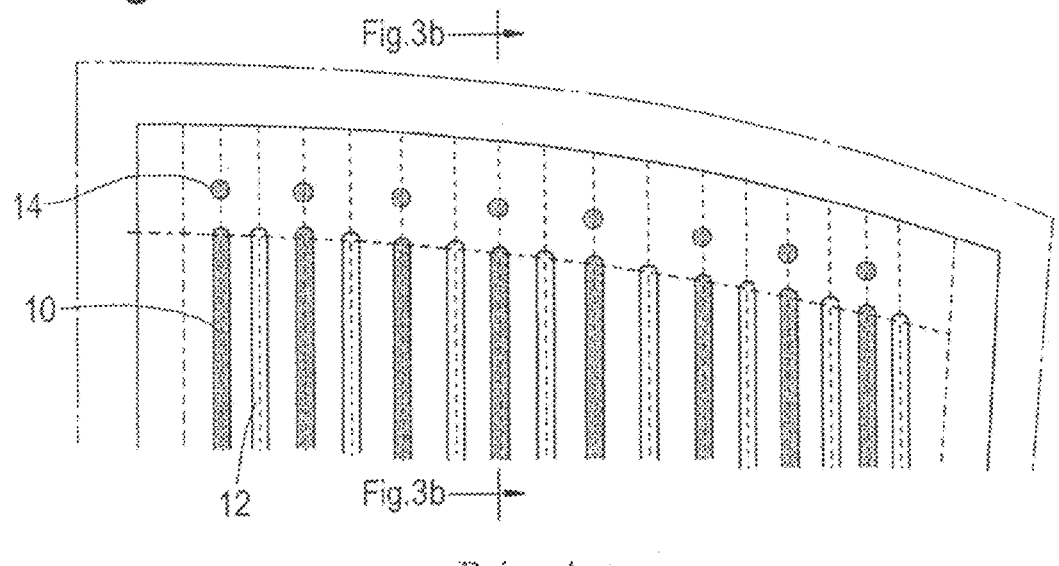
FIG. 3a shows a view of a fan blade in the region of the tip with a previously-proposed stop-off material pattern.
Figure 3B:
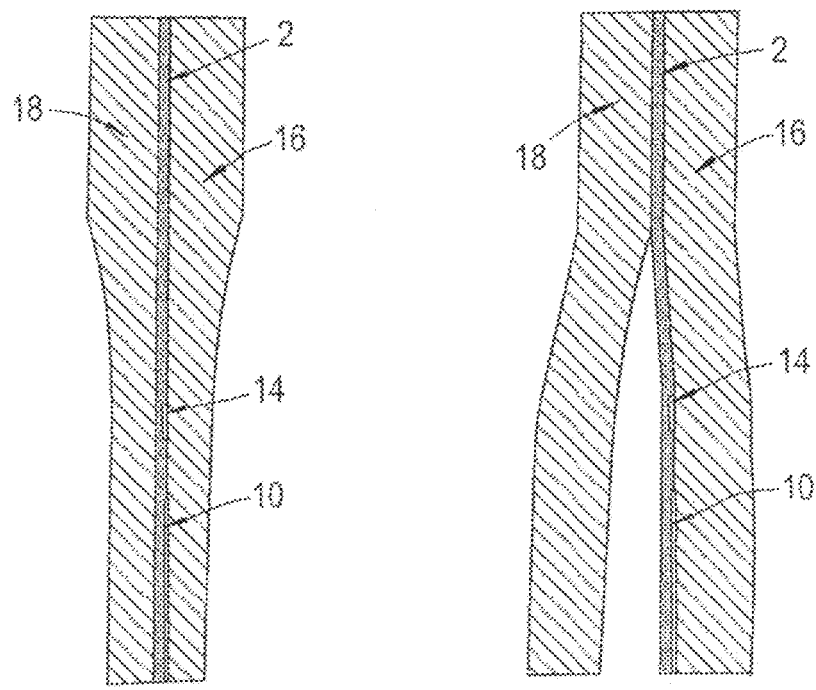
FIG. 3b shows a sectional view of the fan blade tip shown in FIG. 3a (i) before superplastic expansion; and (ii) after superplastic expansion.
Figure 4A:
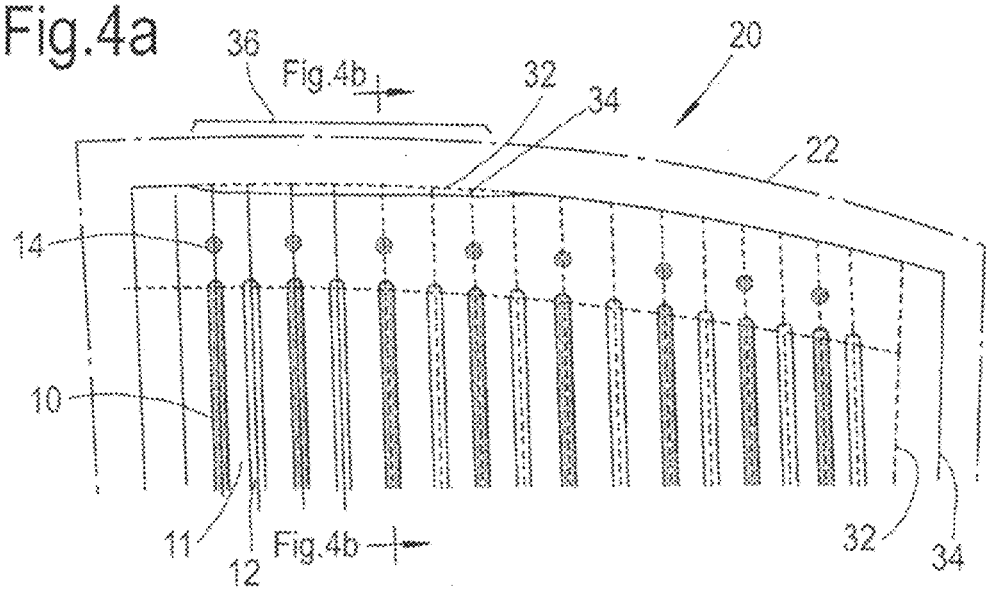
FIG. 4a shows a view of a fan blade in the region of the tip with a stop-off material pattern according to a first embodiment of the invention.
Figure 4B:
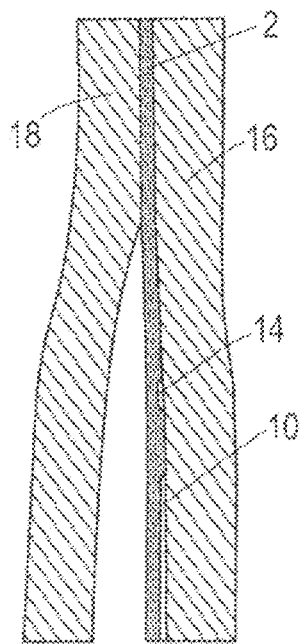
Figure 4B:
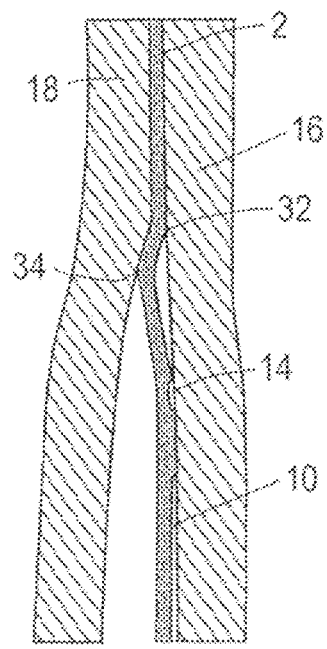

With reference to FIG. 4b(ii), a blade 20 for a turbomachine according to a first embodiment of the present invention comprises three layers: a suction surface layer 16, a pressure surface layer 18 and a membrane 2, which is disposed between the suction and pressure surface layers 16, 18. Prior to bonding the suction surface and pressure surface layers 16, 18 to the membrane 2, a stop-off material is applied to both the suction surface and pressure surface layers on the sides closest to the membrane 2. The stop-off material may alternatively be applied to the respective sides of the membrane 2. Once the stop-off material has been applied, the layers are stacked together and heat and pressure are applied such that a diffusion bond is formed between the respective layers, except that a diffusion bond is not formed where the stop-off material has been applied. The blade 20 is then located between appropriately shaped dies and is placed within an autoclave. The blade 20 and dies are heated and pressurised fluid is supplied into the interior of the blade to cause at least one of the layers to be superplastically formed to produce a blade matching the shape of the dies. The blade 20 may also be twisted into shape.

FIG. 4a shows where the stop-off material is to be applied in the region of the blade tip, according to a first embodiment of the present invention (the blade hub is not shown). On the suction side of the membrane 2, the stop-off material is applied within a region defined by inner suction side edge 32. Accordingly, there is no stop-off material between an outer edge 22 of the blade 20 and the inner suction side edge 32, thereby ensuring that a diffusion bond is able to form between the membrane 2 and the suction surface layer 16 around the edge of the blade 20. On the suction side of the membrane 2, the stop-off material is also not applied in regions defined by one or more strips 10 and one or more dots 14. The strips 10 are arranged in a substantially radial direction (i.e. in a span-wise direction from the hub to the blade tip) and the strips 10 stop short of the inner suction side edge 32. The dots 14 are arranged in line with the strips 10 and are disposed between the strips 10 and the inner suction side edge 32. The dots 14 are not necessarily circular in shape and may be any desired shape. Similarly, the strips 10 are not necessarily substantially rectangular in shape, but may also be any desired shape.

On the pressure side of the membrane 2, the stop-off material is applied within a region defined by inner pressure side edge 34. Accordingly, there is no stop-off material between the outer edge 22 of the blade 20 and the inner pressure side edge 34, thereby ensuring that a diffusion bond is able to form between the membrane 2 and the pressure surface layer 18 around the edge of the blade 20. The inner pressure side edge 34 is substantially the same as the inner suction side edge 32, except that over one or more portions 36 of the blade chord, the inner pressure side edge 34 is closer to the blade hub (i.e. further away from the blade tip) than the inner suction side edge 32. Over portion 36, a greater amount of the pressure surface layer 18 at the blade tip edge will therefore be bonded to the membrane 2 than the suction surface layer 16 will be bonded to the membrane 2. In other words, at the blade tip the size of the diffusion bond in a span-wise direction between the pressure surface layer 18 and the membrane 2 is greater than the diffusion bond between the suction surface layer 16 and the membrane 2 over the portion 36 of the blade chord.

On the pressure side of the membrane 2, the stop-off material is also not applied in regions defined by one or more strips 12. The strips 12 are arranged in a substantially radial direction (i.e. in a span-wise direction from the hub to the blade tip) and the strips 12 stop short of the inner suction side edge 32 at substantially the same distance from the suction side edge 32 as the strips 10 on the suction side.

The strips 12 on the pressure side are arranged such that they are interspersed between the strips 10 on the suction side and the strips 10, 12 are also arranged such that there are gaps 11 between adjacent strips 10, 12. With this arrangement, when the blade 20 is expanded the membrane 2 adheres to the suction surface layer 16 at the strips 10 and the membrane 2 adheres to the pressure surface layer 18 at strips 12. The membrane therefore forms a warren girder type internal structure with the membrane between adjacent strips 10, 12

(i.e. the portion of the membrane overlapping the gaps 11) forming struts and ties between the suction and pressure surface layers 16, 18.

In addition to the aforementioned strips 10, 12, the dots 14 hold the membrane 2 off the pressure surface layer 18, thereby allowing the pressure surface layer to expand to the desired shape. Furthermore, the additional chord-wise portion 36 of the diffusion bond on the pressure surface side of the membrane 2 causes the membrane 2 to lift away from the suction surface layer 16 during the superplastic expansion as is shown in FIG. 4b(ii). The portion 36 therefore provides a gas flow path between the membrane 2 and the suction surface layer 16 in the region of the blade tip, which enables sufficient gas to flow around the dots 14 on the suction side and ensures that the suction surface layer 16 is able to expand to the desired shape during the expansion process. (By contrast, FIG. 4b(i) shows the prior art arrangement without the portion 36 in which the membrane is not lifted off the suction surface layer 16.)

Figure 5:
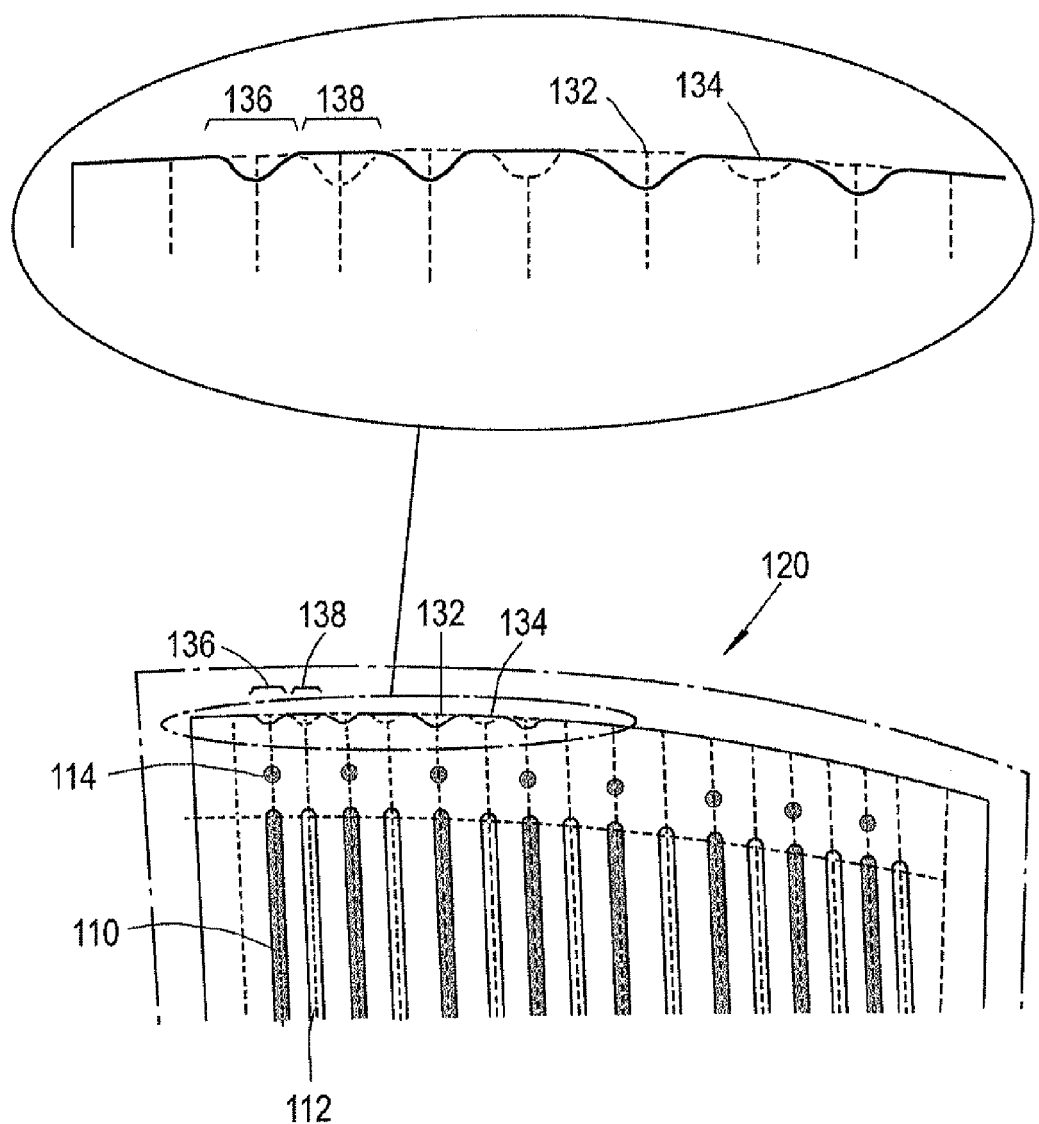
FIG. 5 shows a view of a fan blade in the region of the tip with a stop-off material pattern according to a second embodiment of the invention.

With reference to FIG. 5, a blade 120 according to a second embodiment of the invention is shown. The blade 120 is substantially the same as that of the first embodiment, except that over one or more portions 138 of the blade chord, an inner suction side edge 132 is closer to the blade hub than an inner pressure side edge 134. Over portion 138, a greater amount of the suction surface layer at the blade tip edge will therefore be bonded to the membrane than the pressure surface layer will be bonded to the membrane. In other words at the blade tip the size of the diffusion bond in a span-wise direction between the suction surface layer and the membrane is greater than the diffusion bond between the pressure surface layer and the membrane over the portion 138 of the blade chord.

As for the first embodiment, the blade 120 according to the second embodiment of the invention also comprises one or more portions 136 of the blade chord, over which the inner pressure side edge 134 is closer to the blade hub than the inner suction side edge 132. Over portion 136, a greater amount of the pressure surface layer at the blade tip edge will therefore be bonded to the membrane than the suction surface layer will be bonded to the membrane. In other words, at the blade tip the size of the diffusion bond in a span-wise direction between the pressure surface layer and the membrane is greater than the diffusion bond between the suction surface layer and the membrane over the portion 136 of the blade chord.

The portions 136 and 138 are offset from one another in a chord-wise sense. With a plurality of portions 136, 138, the portions 136, 138 may be interspersed such that the size of the diffusion bond in a span-wise direction between the pressure surface layer and the membrane oscillates and the size of the diffusion bond in a span-wise direction between the suction surface layer and the membrane also oscillates, but in anti-phase with the diffusion bond between the pressure surface layer and the membrane. The inner pressure side edge 134 and inner suction side edge 136 may therefore resemble wavy lines. The portions 136 are in line with dots 114 and strips 110 on the suction surface layer, whilst the portions 138 are in line with strips 112 on the pressure surface layer. The portions 136 and 138 serve to provide a gas flow between the membrane and the pressure surface and suction surface layers in the region of the blade tip, thereby enabling sufficient gas flow either side of the membrane.

The invention claimed is:

1. A method of manufacturing a blade for a turbomachine by superplastic forming and diffusion bonding a first layer, a second layer and a membrane, the membrane being disposed between the first and second layers, the method comprising:
   applying a stop-off material in a first predetermined pattern between the first layer and the membrane so as to prevent a diffusion bond from forming between the first layer and the membrane across said first predetermined pattern; and
   applying additional stop-off material in a second predetermined pattern between the second layer and the membrane so as to prevent a diffusion bond from forming between the second layer and the membrane across said second predetermined pattern; wherein
   the first and second predetermined patterns are arranged so as to allow a diffusion bond to be formed along the blade tip edge, the diffusion bond along the blade tip edge extending across the blade in a chord-wise direction;
   the first and second predetermined patterns are applied so that over at least a first portion of the blade chord at the blade tip, a greater portion of the first layer at the tip edge, extending in a span-wise direction, is diffusion bonded to the membrane than the opposing second layer;
   the second pattern is applied such that it defines one or more strips arranged in a span-wise direction, the strips being void of the additional stop-off material;
   the second pattern is applied such that it defines one or more dots, the dots being void of the stop-off material; and
   the second pattern is applied such that one of the one or more dots are located between one of the one or more strips and the blade tip edge.

2. The method of manufacture according to claim 1, wherein the first pattern is applied such that it defines one or more strips arranged in a span-wise direction, the strips being void of the stop-off material.

3. The method of manufacture according to claim 1, wherein the first layer forms a pressure surface or a suction surface of the turbomachine blade and the second layer forms the other of the pressure surface or suction surface.

4. The method of manufacture according to claim 1, wherein the blade is a compressor fan blade.

5. The method of manufacture according to claim 1, wherein the method further comprises applying the first and second predetermined patterns so that over at least a second portion of the blade chord at the blade tip, a greater portion of the second layer at the tip edge extending in a span-wise direction is diffusion bonded to the membrane than the opposing first layer.

6. The method of manufacture according to claim 1, wherein the method further comprises heating and pressing the first and second layers and the membrane to diffusion bond the first and second layers and the membrane together to form an integral structure.

7. The method of manufacture according to claim 1, wherein the method further comprises placing the first and second layers and the membrane between appropriately shaped dies; heating the first and second layers, the membrane and dies; and supplying a pressurized fluid between the first and second layers to cause at least one of the first and second layers to be superplastically formed.

* * * * *